United States Patent Office 3,033,247
Patented May 8, 1962

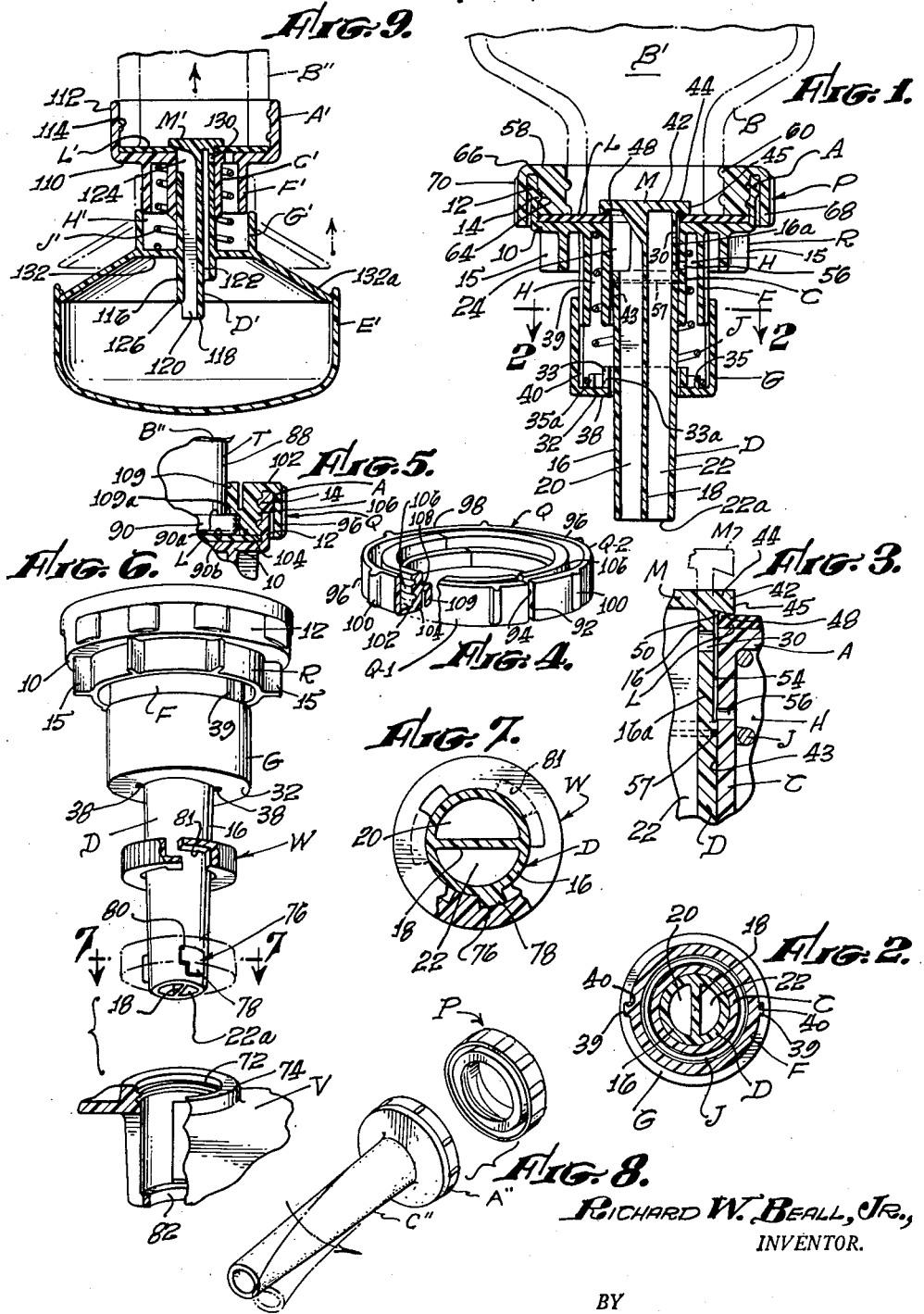

3,033,247
VENTED NON-DRIP LIQUID DISPENSING
DEVICE
Richard W. Beall, Jr., Hermosa Beach, Calif., assignor of one-half to Linden H. Chandler, Lomita, Calif.
Filed Sept. 11, 1961, Ser. No. 139,327
11 Claims. (Cl. 141—308)

The present invention relates to the field of liquid dispensing devices, and more particularly to an air-vented dispenser that may be affixed to the tubular liquid discharge member of a bottle, carboy, can or other container to normally seal the contents thereof out of contact with the ambient atmosphere, but with the device being actuatable to dispense liquid from the container when placed in an inverted position whereby air concurrently enters the container as the contents thereof flow therefrom to equalize the air pressure within the container and atmospheric pressure. The present application is a continuation-in-part of copending patent application entitled Vented Non-Drip Liquid Dispensing Device filed in the United States Patent Office August 5, 1958, under Serial No. 753,239 now abandoned, which application is a continuation-in-part of my application, Ser. No. 583,090, entitled Liquid Dispensing Device, filed May 7, 1956, which issued as Patent No. 2,963,205 on December 6, 1960.

The primary purpose in devising the present invention is to provide means by which a continuous flow of liquid may be obtained as desired from an inverted container such as a bottle, carboy, can, distilled water container for a storage battery or the like, irrespective of whether the container is provided with a screw-on or snap-on type liquid discharge member, yet with the liquid in such container remaining completely sealed out of atmospheric contact when not being discharged therefrom.

Another object of the invention is to provide a liquid dispenser which is so vented that the pressure in the interior of the container to which it is affixed is equalized with the atmospheric pressure as liquid flow from the container occurs.

A further object of the invention is to provide a liquid dispenser of the type described by means of which liquid flows from an inverted container without gurgling, or without the liquid stream moving laterally as it is discharged into a receptacle, which features are of utmost importance from a safety standpoint in the case of a strong acid, alkali, organic solvent, or poisonous fluids that could cause injury upon personal contact therewith.

A still further object of the invention is to provide an air-vented liquid dispensing device in which all parts thereof contactable by the liquid in the container on which it is mounted can be fabricated from inert, non-metallic materials, whereby the dispensed liquid is free of contaminating dissolved substances acquired during storage in the container or when discharged therefrom.

Yet another object of the invention is to provide an air-vented liquid dispensing device of relatively simple construction, all parts of which, except for a spring, are adapted to be injection molded, and the assembly of the component parts thereof into an operative unit being such a simple operation that it can be performed by a person having little or no mechanical skill.

A still further object of the present invention is to provide a liquid dispensing device that is substantially maintenance and trouble-free due to the simplicity of its structure and the relatively few movable parts embodied therein, whereby the device is adapted to sustain rugged, continuous use such as encountered in garages and service stations in filling storage batteries with distilled water.

Yet another object of the invention is to supply a liquid dispensing device that is adapted to fill each cell of a storage battery, or the like, with distilled water to a predetermined height without the attendant being required to watch the operation, with the flow of water automatically ceasing when this predetermined height is reached.

A further object of the invention is to provide a distilled water dispensing device for use in filling storage battery cells that completely eliminates the hazard of overfilling or underfilling of a cell.

A still further object of the invention is to provide a liquid dispensing device which by the use of either a first or second adapter, is capable of being removably affixed to either a screw-on or snap-on type of tubular liquid discharge member.

These and other objects and advantages of the invention will become apparent from the following description of a preferred and certain alternate forms thereof when taken in conjunction with the accompanying drawing, in which:

FIGURE 1 is a longitudinally extending cross-sectional view of a preferred form of the invention, shown with a first form of adapter associated therewith that permits removable attachment of the device to a container having a screw-on type tubular liquid discharge member;

FIGURE 2 is a transverse cross-sectional view of the invention taken on line 2—2 of FIGURE 1;

FIGURE 3 is a fragmentary, enlarged view of a portion of the invention shown in FIGURE 2;

FIGURE 4 is a perspective view of a second form of adapter of split construction capable of being removably mounted on a snap-on type tubular liquid discharge member to which the preferred form of invention may be threadedly engaged in a liquid communicating position with the interior of the container which said discharge member forms a part;

FIGURE 5 is a fragmentary, longitudinal, cross-sectional view of an edge portion of a snap-on type tubular liquid discharge member on which said second form of adapter is mounted;

FIGURE 6 is a perspective view of the preferred form of the invention which has been modified to form lugs on the combined liquid discharge and air vent member, which lugs are not only adapted to seat on the target in a storage battery, but can removably engage an expander, which in turn seats on the upper surface of the boss surrounding the water inlet of a storage battery cell;

FIGURE 7 is a transverse cross-sectional view of the preferred form of the invention taken on line 7—7 of FIGURE 6;

FIGURE 8 is a perspective view of a tubular liquid discharge spout that can be removably affixed to either a screw-on or snap-on type liquid discharge member by use of said first and second adapters, respectively; and FIGURE 9 is a longitudinal, cross-sectional view of a first alternate form of the invention.

Referring to the drawing for the general arrangement of the preferred form of the invention which may be removably attached to either a screw-on or snap-on type of tubular liquid discharge member of a container, it will be seen in FIGURES 1–7 inclusive to include a cup-shaped member A of substantially greater cross-sectional area than that of a tubular liquid discharge member or neck B on which the invention may be mounted.

Member A has a centrally disposed opening formed therein which communicates with a coaxially aligned tubular guide C that depends from member A. A combined liquid discharge and air vent member D of tubular construction is slidably mounted in guide C, as may best be seen in FIGURE 1. In the same figure it will be noted that a cylindrical flange F considerably shorter than member D but substantially larger in cross-sectional area, also depends from member A in an encircling position about the upper portion of member D. A second cylindrical flange G is provided that slidably engages the exterior surface of flange F (FIGURE 1), with this second flange being rigidly affixed to the combined liquid discharge and air-vented member D, as will hereinafter be explained in detail.

The first flange F and second flange G serve to define a longitudinally extending annulus-shaped space H therebetween in which a compressed helical spring J is disposed. This spring at all times tends to move flange G and member D outwardly from cup-shaped member A. A resilient washer L formed from an inert material that has no appreciable solubility in the liquid stored in the container B' of which neck B forms a part is disposed in the lower portion of member A (FIGURE 1) and effects a fluid-tight seal with the lower extremity of neck B. The washer L cooperates with a flat valve member M to effect a seal therewith when the valve member is brought into pressure contact therewith. Valve member M is mounted on a first upper end portion of liquid discharge member D. Although washer L is shown as providing a resilient surface, it will be apparent that the same effect could also be provided by a layer of resilient material bonded to the appropriate surface of member A.

In detailed structure the cup-shaped member A includes a circular plate 10, preferably formed from a molded, polymerized resinous material, that has a cylindrical side wall 12 of the same material projecting outwardly and normally positioned relative to the outer circumferential edge portion thereof. Threads 14 are formed on the interior surface of side wall 12 which are adapted to engage a complementary threaded surface formed on a first adapter P, as will later be explained in detail, that serves to affix the invention to the threaded discharge member or neck B, or threads formed on a second adapter Q shown in FIGURES 4 and 5, that permits the invention to be affixed to a tubular discharge member T of the snap-on type.

A ring-shaped handle R that is outwardly spaced from first flange C depends from member 10, and is provided with a number of circumferentially spaced radially disposed ribs 15 to facilitate manual rotation of the handle.

The combination member D includes an elongate cylindrical side wall 16 that has a first liquid discharge port 24 and a second, oppositely disposed air vent port 30 formed in the first upper end portion of member D, as shown in FIGURE 1. Valve member M is held on the first upper end portion of member D by a partition 18 that is connected to the lower surface of the valve member and extends downwardly into the tubular side wall 16 of member D, between the first and second ports 24 and 30.

In addition to supporting the valve member M on tubular member D, the partition 18 also cooperates with the interior of side wall 16 to define a first liquid discharge passage 20 and an air vent passage 22 therein. Passage 20 communicates with first port 24, and air vent passage 22 with second port 30.

When container B' is inverted, liquid discharges from neck B thereof through first port 24 into passage 20, and then as a smooth stream free of gurgling, from the lower end of the tubular member D. The liquid stream so discharging is of smaller transverse cross section than that of the interior of tubular side wall 16, and as a result in no way hinders flow of air from the ambient atmosphere upwardly through member D. Air entering the combination member D flows through the passage 22 and second port 30 into the neck B and container B' to vent the latter as liquid discharges therefrom.

The lower end portion of second flange G develops into a circular plate 32 that slightly tapers downwardly and inwardly to the exterior surface of side wall 16, with the plate preferably being formed as an intergral part thereof. A first boss 33 projects from plate 32 in the direction of flange C and is circumferentially spaced a slight distance from the exterior surface of side wall 16. A second boss 35 also projects from plate 32 in a direction corresponding to that of boss 3, with the second boss and interior surface of flange G cooperatively forming a relatively narrow annulus-shaped space therebetween. The lower coiled end portion of spring J is positioned in the space between flange G and boss 35, and rests on the upper surface of plate 32.

First boss 33 has a number of circumferentially spaced, longitudinal slots 33a formed therein through which fluid may flow into the confined space between this boss and side wall 16, to drain therefrom through opposing openings 38 formed in plate 32, as can best be seen in FIGURE 6. A number of longitudinal slots are formed in second boss 35 that permit liquid to flow downwardly from the annulus-shaped space between the second boss and flange G onto plate 32, and discharge through openings 38.

Flange F has two oppositely disposed, longitudinally extending ribs 39 formed thereon that are slidably movable and interlock with oppositely disposed complementary grooves 40 formed in the interior surface of flange G. Inasmuch as the cooperative function of ribs 39 and grooves 40 is to prevent relative rotation of the first and second flanges, positioning of the ribs and grooves could be reversed, if desired.

Valve member M (see FIGURES 1 and 3), is circular and includes a valve plate 42 of substantially larger cross-sectional area than the previously mentioned opening formed in plate 10, which opening is now identified by the numeral 43. Valve plate 42 extends above the upper surface of side wall 16 to form a circumferentially extending lip 44. Lip 44 is defined by a circumferential exterior surface 45 and a lower, downwardly and outwardly projecting surface 48 which intersects with surface 45 and provides a narrow, ring-shaped area 48 that seats on the upper surface of resilient washer L to effect a fluid-tight seal therewith. A longitudinal section 16a of side wall 16 extends the length of port 24 and is slightly smaller in cross-sectional area than the balance of the side wall. In consequence, the annulus-shaped space 54 is formed between the exterior surface of section 16a and the interior surface of first flange C. A third port 56 is formed in flange C in substantially longitudinal alignment with second port 30, and communication between third port 56, first port 24, and second port 30 is effected by space 54 when valve member M is in sealing contact with washer L. Constant longitudinal alignment of third port 56 and second port 30 is maintained by the interlocking ribs 39 and grooves 40 of first flange C and second flange G. First port 24 is considerably larger in area than second port 30. The larger size of port 24 permits discharge of liquid from neck B at such a rate that air enters the neck through port 30 at such velocity that no appreciable flow by liquid takes place from neck B into vent passage 22.

A sealing ring 57 having a slightly larger external diameter than that of the portion of side wall 16 below section 16a thereof is preferably formed as an integral part of the side wall, and is so longitudinally positioned thereon as to at all times be in sliding liquid-sealing contact with the interior surface of flange C. The ring 57 prevents liquid from seeping downwardly therebelow in the space between the exterior surface of tubular member D and the interior surface of guide C.

When the combined liquid discharge and air vent member D is moved upwardly relative to member A, valve member M is concurrently moved upwardly out of liquid sealing contact with washer L whereby liquid immediately discharges from container B', port 24 and passage 20. Concurrent with initiation of fluid flow from container B' as described, air from the ambient atmosphere enters upwardly through passage 22 to equalize the pressure within the container and the outside thereof.

When the combined liquid discharge and air vent member D is allowed to move downwardly relative to member A to place valve member M in a sealing position in contact with washer L, a small amount of liquid may flow into air vent passage 22 in the last stage of the closing operation. It is, of course, undesirable to allow liquid to remain in either of the passages 20 or 22, for after a period of time it may drip from member D onto the supporting surface of the container. However, it is only possible for liquid to remain in passages 20 and 22 after the valve is closed, in the event a partial vacuum is formed in either one or both of the passages between the liquid column and the under side of valve member M. It should be particularly noted (FIGURES 1 and 3) that in the present invention such a partial vacuum can neither form nor exist in either passage 20 or 22. When valve member M is closed, the upper portion of passages 20 and 22 are at all times in communication with third port 56, due to the annulus-shaped space 54. Port 56 in turn communicates with space H, which due to the loose sliding fit of first flange C and second flange G, is at all times under atmospheric pressure. Thus, liquid trapped in either passage 20 or 22 will immediately drain therefrom when valve member M assumes the closed position.

The first form of adapter P (FIGURE 1) includes a ring-shaped body 58 preferably formed from a polymerized resinous material, the interior surface of which has threads 60 formed thereon that are engageable with threads formed on the exterior of the tubular liquid discharge member B. An outer circumferential surface of body 58 has threads 64 formed thereon that engage threads 14 formed on the interior surface of side wall 12 of the cup-shaped member A.

A circular extension 66 projects from the upper exterior portion of body 58, and the outer extremity of this extension develops into a downwardly depending cylindrical flange 68 having a number of circumferentially spaced, longitudinal ribs 70 formed thereon for ease in securely gripping the adapter when being placed on or removed from neck B.

When it is desired to utilize the preferred form of the invention to refill a cell of a storage battery V having a water inlet 72 (FIGURE 6) that is defined by an upwardly projecting ring-shaped boss 74, the combined liquid discharge and air-vented member D is inserted downwardly within the confines of inlet 72 sufficiently to place the lower surface of plate 32 in contact with the upper surface of boss 74. Thereafter, exertion of downward manual force on container B' (or the weight of the container and the water therein may be sufficient) further compresses spring J and moves first flange C, together with the previously described associated elements, downwardly relative to second flange G.

Upon actuation of this preferred form of the invention in this manner the length of the combined liquid discharge and air-vented member D must be such that the lower extremity thereof is disposed within the confines of the storage battery cell at an elevation therein to which it is desired to raise the water level. Downward movement of flange C and elements associated therewith in the manner above-described results in relative movement between valve member M and washer L to place member M in the position shown in phantom line in FIGURE 3. Immediately upon separation of valve member M from washer L, liquid starts to flow downwardly from discharge member B into passage 20. Also immediately upon separation of valve member M from washer L, sufficient air enters container B' to equalize the interior and exterior pressures exerted thereon. The upward passage of air can initially occur through both space H and passage 22, through second port 30 into container B'. However, continued upward movement of member D relative to first flange C positions sealing ring above third port 56, and obstructs communication between the interior of container B' and space H.

Thereafter, until the combined liquid discharge and air vent member D is moved downwardly relative to first flange C to place sealing member 57 below port 56, air entering container B' must first traverse passage 22. The velocity of upward flow of air through passage 22 when first port 24 is in the fully open position is sufficient to prevent downward flow of liquid into passage 22. The closed position of valve member M is shown in solid line in FIGURE 3, and the open position thereof is shown in phantom line in the same figure. The material from which washer L is fabricated is preferably softer than that of valve member M. When in the position shown in FIGURE 1, spring J must possess sufficient strength to maintain valve member M in contact with the softer material of washer L with sufficient force to effect a fluid-tight seal therewith.

It will be apparent that with the structure of the preferred form of the invention above described, after the liquid level in storage battery V has risen to a height flush with the lower straight edge 22a on the second end portion of tubular member D, further liquid flow from tubular member D will cease, for the liquid level obstructs the flow of air from the ambient atmosphere into the tubular member.

A modified form of the invention is shown in FIGURE 6 wherein it will be noted that a number of circumferentially spaced positioning lugs 76 are mounted on, or formed as integral parts of the side wall 16. Each of these lugs 76 is preferably of L-shaped configuration and has a leg 78 which is parallel to the longitudinal axis of member D, and a leg 80 that is normal to this axis.

This modified form of the invention is particularly well adapted for use in filling and re-filling the cells of a conventional six-volt storage battery identified generally by the letter V, of the type used on automotive vehicles, which has a ring-shaped target 82 of appreciable thickness situated a predetermined distance below the upper extremity of boss 74 that defines water inlet 72. Target 82 is so situated in battery V that the level of the distilled water therein is correct when just flush with the lower surface of the target. Accordingly, lugs 76 are so disposed on member D that the longitudinal distance between the lower extremity of legs 78 thereof and the free extremity of member D is precisely the same as the thickness of target 82. Also, lugs 76 extend outwardly sufficiently from member D that not only are they engageable with the upper surface of target 82, but are insertable within the confines of boss 74. When member D is inserted in one of the bosses 74 with the lower faces of legs 78 resting on the upper surface of target 82, it will be apparent that water may be added to a battery cell from container B' and raise the water level therein to the correct elevation without the necessity of supervision by an attendant.

In the new twelve-volt batteries used on present-day automotive vehicles, the battery bosses 74 are considerably larger in cross-sectional area, as are the internal diameters of targets 82. The modified form of the present invention can be utilized to automatically fill such batteries to the proper water level by providing the expander ring W shown in FIGURE 6 in which slots 81 are formed that are so shaped as to receive and removably interlock with legs 80. Rotation of a ring W relative to lugs 76 causes the lugs and slots 81 to interlockingly hold the ring in fixed, longitudinal position on member D, with the air inlet being located at the elevation in the battery to which it is desired to raise the water level.

Occasionally it may be desirable to affix the preferred form of invention to a container provided with a snap-on type tubular liquid discharge member T (FIGURE 5). Member T comprises a straight-walled cylindrical shell 88 that terminates on the outer extremity thereof in a circumferentially extending bead 90. In order to conveniently removably affix the preferred form of the invention to member T, a second adapter Q is provided, which is shown in perspective in FIGURE 4 in inverted position. As shown in detail in FIGURE 4, adapter Q is of split construction and includes two identical semi-circular segments Q–1 and Q–2. These segments have free end portions 92 and 94, respectively, that are adapted to be brought into abutment (FIGURE 4). A transversely bendable band 96 forms the outer portion of segments Q–1 and Q–2, and flexes sufficiently along a line 98 opposite end portions 92 and 94 when adapter Q is in the closed position to permit sufficient separation of these end portions that adapter Q can be placed on shell 88 in the encircling position shown in FIGURE 5. For gripping ease in rotating band 96, a number of circumferentially spaced ribs 100 are formed on the exterior surface thereof.

Segments Q–1 and Q–2 are identical structurally, and accordingly, the structure of segment Q–1 will be described in detail herein. The portion of band 96 embodied in segment Q–1 has an offset 102 extending inwardly from one edge portion thereof, as best seen in FIGURE 5. The inner edge portion of offset 102 develops into a semi-circular rib 104 which parallels band 96. Threads 106 are formed on that face of rib 104 adjacent band 96. A relatively narrow, circumferentially extending protuberance 108 projects inwardly from the inner face of this rib and develops into a semi-circular member 109 that is parallel, but oppositely disposed relative to band 96. Member 109 snugly engages the exterior surface of discharge member T, and the edge portion of member 109 most adjacent to bead 90 may rest on the surface 90a thereof (FIGURE 5). With the adapter Q disposed in an encircling position as shown in this figure, when member A is rotated relative thereto, threads 14 are caused to engage threads 106 of rib 104 whereby surface 90b of bead 90 is brought into fluid-tight engagement with washer L.

It will be apparent that by means of adapter Q just described, the preferred and modified forms of the invention can be removably mounted on a snap-on type of tubular liquid discharge member T. When the modified form of the invention is so mounted, it can be used to dispense liquids, and is vented in precisely the same manner as the preferred form previously described in detail.

A first alternate form of the invention is shown in FIGURE 9 wherein it will be seen that a threaded cup-shaped member A' is provided that may be threadedly and removably mounted on a threaded bottle neck B'' such as that shown in inverted position in FIGURE 1, of a wine or brandy bottle, or a carboy containing acid. Member A' has a tubular member C' depending downwardly therefrom in which a combined fluid discharge and air-vented member D' is slidably mounted. A combination shield and actuating member E' for initiating liquid flow is affixed to member D'.

A first cylindrical flange F' extends downwardly from member A', and together with a second cylindrical flange G' affixed to shield E', cooperatively defines an annulus-shaped enclosed space H' in which a compressed helical spring J' is housed. A resilient washer L' is disposed in the lower portion of member A' that effects a fluid-tight seal with the lower extremity of neck B', as well as with a valve member M' affixed to the upper end of the combined liquid discharge and air-vent member D' when brought into forceful contact therewith by action of spring J'.

In detailed structure, the cup-shaped member A' includes a circular plate 110 that has a cylindrical side wall 112 projecting upwardly from the outer circumferential edge portion thereof. Threads 114 are provided on the interior of side wall 112 which engage threads that are normally formed as a part of bottle neck B''. Flange F' is preferably formed as an integral part of plate 110, and depends downwardly therefrom, as best seen in FIGURE 1. Tubular member C' is likewise preferably formed as an integral part of plate 110 and depends downwardly therefrom substantially the same distance as flange F'. Member D' is circular in cross section, and of a size to permit slidable movement thereof within the confines of member C', with a portion of member D' projecting below this tubular member.

Member D' comprises an elongate cylindrical side wall 116 in which a longitudinally extending partition 118 is integrally formed. Partition 118 divides the space within side wall 116 into an elongate liquid discharge passage 120 and an air-vent passage 122. The upper portion of partition 118 develops into a circular valve member M' of such dimensions that the under circumferential edge portion thereof seats on the inner upper surface of resilient washer L'. A port 124 is formed in the upper portion of side wall 116 directly below valve seat M', which port communicates with the liquid discharge passage 120. However, port 124 only communicates with liquid within the confines of neck B'' when valve member M' is not in the seated position on washer L', as shown in FIGURE 1. A portion 126 of the lower extremity of member D' is cut away whereby the force of capillary attraction is diminished and liquid is not inclined to adhere to the lower portion of member D'. In addition, a port 130 is formed in side wall 116 directly under valve member M' and opposite port 124, and port 130 is in communication with the air vent passage 122.

A combined conical shield and actuating member E' is integrally formed as a part of member D'. The helical spring J' (FIGURE 1) is compressed, with the upper end thereof abutting against the lower face of plate 110, and the lower end of the spring resting on the upper surface of plate 132. When it is desired to utilize the preferred form of the invention, a glass or other receptacle (not shown) is brought into contact with the under side of actuating member E' and moved upwardly. This upward movement of the receptacle causes concurrent upward movement of second flange G' and the combined member D', whereby fluid can flow from neck B'' through port 124 into the passage 120. Likewise, air can flow upwardly through air vent passage 122 and port 130 into the confines of the bottle of which neck B'' forms a part, to equalize the air pressure in the bottle and that of the ambient atmosphere during liquid discharge through member D'.

After liquid has risen in the receptacle into which it is being poured to a point where it contacts the lower extremity of the passage 122, air can no longer enter passage 122 and thereafter liquid flow from passage 120 ceases thereby preventing overfilling of the receptacle or overflow of liquid. However, liquid flow from a bottle or container can be immediately stopped at any time by simply moving the receptacle downwardly, together with valve member M', which then seats on washer L' to effect a fluid-tight seal therewith. Thus it will be seen that by use of the above-described invention liquid can only be discharged into a receptacle to a certain elevation therein and inadvertent overfilling of the receptacle is thereby avoided. This desirable feature is also common to those forms of the present invention shown in FIGURES 2, 3 and 4. Also, by use of this device, liquid can be discharged into a receptacle to the desired level therein and the further flow of liquid immediately terminated when the receptacle is moved downwardly. If for sanitary reasons it is desired to seal the lower portion of shield E', a convex-concave member may be clipped to the outer circumferential portion of the shield. Use of such a convex-concave member is desirable when wine is dispensed, for certain insects are attracted by the odor.

While it will be apparent from the preceding discussion and description of the preferred form of the invention that it is capable of being used with either adapters P or Q, the invention shown in FIGURE 6, without the use of adapters, can be removably screwed onto the threaded neck B (not shown) of a container of proper dimensions and having complementary threads formed thereon by engagement with threads 12, and thereafter used for the purpose and in the same manner described hereinabove.

A second alternate form of the invention is shown in FIGURE 8 that includes a cup-shaped member A'' of the same structure as member A, except that no handle R depends therefrom and the tubular guide member C is elongated to act as a pouring spout C''. Pouring spout C'' is preferably formed of a resilient polymerized resinous material which will not break when the second alternate form of the invention projects from a container (not shown). The second alternate form of the invention is adapted to be removably mounted on tubular liquid discharge members of either the screw-on type B or snap-on type T by use of adapters P and Q respectively. When so disposed, the second alternate form of the invention is used as a conventional pouring spout.

It will be obvious to those skilled in the art that various changes may be made in the present invention without departing from the spirit and scope thereof, and therefore the invention is not limited by that which is shown in the drawing and described in the specification, but only as indicated in the appended claims.

I claim:

1. A dispensing device for use on the tubular neck of a container to seal same and permit free flow of liquid therefrom by the force of gravity, comprising: an elongate straight-walled cylindrical shell having an upper exterior recessed portion in which first and second oppositely disposed ports are located; a partition that extends longitudinally through said shell to divide the interior thereof into a liquid discharge passage and air vent passage communicating with said first and second ports respectively; a valve member mounted on the upper extremity of said partition and projecting transversely outward beyond said shell; a rigid circular plate having an opening formed therein; resilient means covering the upper surface of said plate; a tubular guide depending from the lower surface of said plate in longitudinal alignment with said opening, said shell being slidably mounted in said guide and said recessed portion cooperating therewith to define an annulus-shaped space when said recessed portion is disposed in said guide; mounting means removably engageable with said neck for holding said plate, guide, shell and valve member thereon in a position where said resilient means is in liquid sealing contact with the lower extremity of said neck; first means disposed exteriorly of said passages that tends at all times to move said shell and valve member in a direction to maintain said valve member in pressure contact with said resilient means; second means on said shell for moving said shell and valve member relative to said plate into a position where said valve member is separated from said resilient means and said first and second ports are in communication with the interior of said container to permit free flow of liquid therefrom through said discharge passage with concurrent flow of air thereinto from the ambient atmosphere through said air vent passage; and a third port in said guide that is at all times in communication with the ambient atmosphere and said annulus-shaped space when said valve member is in said pressure contact with said resilient means, which third port when in communication with said annulus-shaped space establishes communication between the ambient atmosphere and said liquid discharge and air vent passage to permit liquid in said discharge passage and any liquid that may enter said air vent passage at the time said valve member effects said pressure contact with said resilient means to drain freely therefrom.

2. A dispensing device for use on the tubular neck of a container to seal same and permit free flow of liquid therefrom by the force of gravity, comprising: an elongate straight-walled cylindrical shell having first and second oppositely disposed ports formed in the upper portion thereof; a partition that extends longitudinally through said shell to divide the interior thereof into a liquid discharge passage and air vent passage communicating with said first and second ports respectively; a valve member mounted on the upper extremity of said partition and projecting transversely outward beyond said shell; a rigid circular plate having an opening formed therein; resilient means covering the upper surface of said plate; a tubular guide depending from the lower surface of said plate in longitudinal alignment with said opening, said shell being slidably mounted in said guide, with said valve member disposed above said resilient means, which valve member when in pressure contact with said resilient means effects a liquid-tight seal therewith; mounting means removably engageable with said neck for holding said plate, guide, shell and valve member thereon in a position where said resilient means is in liquid sealing contact with the lower extremity of said neck; first means disposed exteriorly of said passages for maintaining said valve member in said pressure contact with said resilient means; and second means which include a plurality of circumferentially spaced lugs projecting outwardly from said shell in substantially the same plane, together with a ring in which a plurality of recesses are formed that removably interlock with said lugs when said shell is inserted through said ring and rotated relative thereto, said ring when so mounted being capable of removably engaging a portion of a receptacle surrounding an inlet opening formed therein through which the lower portion of said shell is extended, which second means is used for moving said shell and valve member relative to said plate into a position where said valve member is separated from said resilient means and said first and second ports are in communication with the interior of said container to permit free flow of liquid therefrom through said discharge passage with concurrent flow of air thereinto from the ambient atmosphere through said air vent passage, with said discharge of liquid from said container automatically ceasing when the level of the body of liquid exteriorly of said shell rises to the extent that the entry of air into the lower end of said vent passage is obstructed.

3. An adapter for use in removably affixing a liquid dispensing device having a cylindrical side wall, the interior surface of which is threaded, to a smooth-walled tubular liquid discharge member of smaller transverse cross section having a circumferentially extending, outwardly projecting bead on the outer extremity thereof, comprising: two semi-circular segments; transversely movable means affixed to both of said segments to permit pivotal movement thereof relative to one another; two semi-circular off-sets projecting outwardly from said segments that include semi-circular ribs which are spaced outwardly from the outer surfaces of said segments, said ribs having threads on the interior surfaces thereof that are adapted to engage said threads on said side wall when the ends of said segments are in abutting contact; and two semi-circular protuberances that extend inwardly from said segments and are capable of being disposed in abutting contact with said smooth-walled tubular discharge member and so held when said threads on said side wall engage said threads on said ribs, with the interior diameter of said protuberances being less than the external diameter of said bead, which protuberances serve to removably hold said segments and said cylindrical side wall on said liquid discharge member so long as said ribs are engaged by said threads on said side wall.

4. An adapter as defined in claim 3 wherein each semi-circular segment and semi-circular protuberance projecting therefrom are formed as an integral unit from a polymerized resin that is inert and not subject to corrosion.

5. An adapter for use in removably affixing a liquid dispensing device having a cylindrical side wall, the interior surface of which is threaded, to a tubular liquid discharge member of substantially smaller transverse cross section having threads formed on the exterior surface thereof, including: a ring-shaped body; first threads formed on the interior surface of said body that are capable of removably engaging said threads on said liquid discharge member; second threads formed on the exterior surface of said body that are capable of engaging said threads on said cylindrical side wall; a circumferential extension projecting outwardly from an edge portion of said body; a cylindrical flange projecting downwardly from said extension and outwardly spaced from said body a sufficient distance to permit a portion at least of said side wall to be disposed between said flange and body; and a plurality of spaced members projecting outwardly from the exterior surface of said flange to facilitate gripping said adapter when the same is rotated relative to said side wall or liquid discharge member, with said body, first and second threads, extension and flange being integrally formed of a polymerized resin that is inert and not subject to corrosion.

6. A device capable of being removably mounted on a tubular neck of a container for dispensing a liquid therefrom into a storage battery cell having a liquid inlet opening that is defined by an upper ring-shaped boss and a ring-shaped target situated therebelow until the liquid level in said cell has risen to a desired relationship with said target, whereupon said dispensing automatically ceases, which device includes:

(a) a first circular plate having an opening formed therein;

(b) means for removably holding said plate on the outer extremity of said neck with said opening communicating with the interior thereof;

(c) a tubular guide in longitudinal alignment with said opening and projecting downwardly from said plate;

(d) resilient means covering the upper surface of said first plate that effects a seal with said outer extremity when said plate is held on said neck;

(e) a tubular member slidably mounted in said guide, said member having a first upper end portion in which first and second oppositely disposed ports are formed, which member has a second end portion that terminates in a straight transverse edge;

(f) a valve member of greater transverse cross section than that of said opening in said plate, which valve member is mounted on said first end portion of said tubular member and disposed above said resilient means;

(g) partition means in said tubular member for dividing the interior thereof so that liquid flowing therein from said first port is directed downwardly as a stream that but partially fills said tubular member and permits an air stream to flow upwardly in said tubular member from the ambient atmosphere to enter said container through said second port and vent the same;

(h) a second plate disposed normally to said tubular member and projecting therefrom, said plate having a lower surface that can contact the upper surface of said boss to dispose said second end of said tubular member at said desired relationship with said target ring; and (i) a compressed helical spring encircling said tubular member and at all times exerting oppositely directed forces on said first and second plates to at all times urge said tubular member, valve member and second plate in a direction to maintain said valve member in liquid sealing contact with said resilient means, but with said first plate and container capable of being moved relative to said tubular member to place said first and second ports in communication with the interior of said container when said second plate is in pressure contact with said boss and said tubular member extends into said inlet, with liquid then discharging downwardly through said first port and tubular member and air concurrently flowing upwardly from the ambient atmosphere through said tubular member and second port into said container to vent the same until the liquid in said battery cell has risen to said desired relationship with said target ring and contacts said straight edge of said second lower end portion whereupon the liquid in said cell obstructs the flow of air into said tubular member and further discharge of liquid from said container into said cell automatically ceases.

7. A device as defined in claim 6 which further includes:

(a) air passage means for effecting communication between the ambient atmosphere and the upper portions of said liquid discharge passage and said air inlet passage when said valve member is in said liquid sealing contact with said resilient means to prevent a negative pressure existing in said passages that would hold said liquid therein.

8. A device as defined in claim 6 which further includes:

(a) a circumferentially extending recess formed in the exterior surface of said tubular member; and (b) a resilient ring in said recess that is in slidable pressure sealing contact with the interior surface of said guide for preventing seepage of liquid from said container downwardly between said tubular member and guide when said valve member is out of sealing contact with said resilient means.

9. A device as defined in claim 6 which is further characterized by:

(a) said tubular member having an upper recessed portion that cooperates with said valve member and the interior surface of said guide to define an annulus-shaped enclosed space when said valve member is in sealing contact with said resilient means; and (b) a third port that extends transversely through said guide and is so positioned thereon as to be in communication with the ambient atmosphere and said annulus-shaped space only when said valve member is in sealing contact with said resilient means, with said annulus-shaped space and third port cooperatively maintaining said liquid discharge passage and air vent passage in communication with the ambient atmosphere, and said communication with the ambient atmosphere preventing a negative pressure existing in said passages that would hold said liquid therein when said valve member is in said sealing contact with said resilient means.

10. A device capable of being removably mounted on a tubular neck of a container for dispensing a liquid therefrom into a storage battery cell having a liquid inlet opening that is defined by an upper ring-shaped boss and a ring-shaped target situated therebelow until the liquid level in said cell has risen to a desired relationship with said target, whereupon said dispensing automatically ceases, which device includes:

(a) a first circular plate having an opening formed therein;

(b) means for removably holding said plate on the outer extremity of said neck with said opening communicating with the interior thereof;

(c) a tubular guide in longitudinal alignment with said opening and projecting downwardly from said plate;

(d) resilient means covering the upper surface of said first plate that effects a seal with said outer extremity when said plate is held on said neck;

(e) a tubular member slidably mounted in said guide, said member having a first upper end portion in which first and second oppositely disposed ports are formed, which member has a second end portion that terminates in a straight transverse edge;

(f) a valve member of greater transverse cross section than that of said opening in said plate, which valve member is mounted on said first end portion of said tubular member and disposed above said resilient means;

(g) partition means in said tubular member for dividing the interior thereof so that liquid flowing therein from said first port is directed downwardly as a stream that but partially fills said tubular member and permits an air stream to flow upwardly in said tubular member from the ambient atmosphere to enter said container through said second port and vent the same;

(h) a second plate disposed normally to said tubular member and projecting therefrom;

(i) a protuberance on said tubular member below said second plate, said protuberance capable of being disposed in said inlet opening to contact said target; and (k) a compressed helical spring encircling said tubular member and at all times exerting oppositely directed forces on said first and second plates to at all times urge said tubular member, valve member and second plate in a direction to maintain said valve member in liquid sealing contact with said resilient means, but with said first plate and container capable of being moved relative to said tubular member to place said first and second ports in communication with the interior of said container when said protuberance is in pressure contact with said target and said tubular member extends into said inlet, with liquid then discharging downwardy through said first port and tubular member and air concurrently flowing upwardly from the ambient atmosphere through said tubular member and second port into said container to vent the same until the liquid in said battery cell has risen to said desired relationship with said target ring and contacts said straight edge of said second lower end portion whereupon the liquid in said cell obstructs the flow of air into said tubular member and further discharge of liquid from said container into said cell automatically ceases.

11. A device capable of being removably mounted on a tubular neck of a container for dispensing a liquid therefrom into a storage battery cell having a liquid inlet opening that is defined by an upper ring-shaped boss and a ring-shaped target situated therebelow until the liquid level in said cell has risen to a desired relationship with said target, whereupon said dispensing automatically ceases, which device includes:

(a) a first circular plate having an opening formed therein;

(b) means for removably holding said plate on the outer extremity of said neck with said opening communicating with the interior thereof;

(c) a tubular guide in longitudinal alignment with said opening and projecting downwardly from said plate;

(d) resilient means covering the upper surface of said first plate that effects a seal with said outer extremity when said plate is held on said neck;

(e) a tubular member slidably mounted in said guide, said member having a first upper end portion in which first and second oppositely disposed ports are formed, which member has a second end portion that terminates in a straight transverse edge;

(f) a valve member of greater transverse cross section than that of said opening in said plate, which valve member is mounted on said first end portion of said tubular member and disposed above said resilient means;

(g) partition means in said tubular member for dividing the interior thereof so that liquid flowing therein from said first port is directed downwardly as a stream that but partially fills said tubular member and permits an air stream to flow upwardly in said tubular member from the ambient atmosphere to enter said container through said second port and vent the same;

(h) a second plate disposed normally to said tubular member and projecting therefrom;

(i) a protuberance on said tubular member below said second plate, said protuberance capable of being disposed in said inlet opening to contact said target;

(k) a slotted ring capable of removably engaging said lug and being supported thereby in an encircling position on said tubular member, said ring having an external diameter greater than the interior diameter of said inlet; and (l) a compressed helical spring encircling said tubular member and at all times exerting oppositely directed forces on said first and second plates to at all times urge said tubular member, valve member and second plate in a direction to maintain said valve member in liquid sealing contact with said resilient means, but with said first plate and container capable of being moved relative to said tubular member to place said first and second ports in communication with the interior of said container when said ring is in pressure contact with said boss and said tubular member extends into said inlet, with liquid then discharging downwardly through said first port and tubular member and air concurrently flowing upwardly from the ambient atmosphere through said tubular member and second port into said container to vent the same until the liquid in said battery cell has risen to said desired relationship with said target ring and contacts said straight edge of said second lower end portion whereupon the liquid in said cell obstructs the flow of air into said tubular member and further discharge of liquid from said container into said cell automatically ceases.

References Cited in the file of this patent

UNITED STATES PATENTS

| | | |
|---|---|---|
| 196,285 | Banker | Oct. 23, 1877 |
| 245,401 | Raynor et al. | Aug. 9, 1881 |
| 919,913 | Miller | Apr. 27, 1909 |
| 966,270 | Van Leir | Aug. 2, 1910 |
| 1,345,965 | Shute | July 6, 1920 |
| 1,372,876 | Freund | Mar. 29, 1921 |
| 2,031,172 | Maloney | Feb. 18, 1936 |
| 2,186,326 | Casarotti | Jan. 9, 1940 |
| 2,337,276 | Sanchis | Dec. 21, 1943 |
| 2,463,922 | Turner | Mar. 8, 1949 |
| 2,504,276 | Olsen | Apr. 18, 1950 |
| 2,685,396 | Day et al. | Aug. 3, 1954 |
| 2,724,535 | Day et al. | Nov. 22, 1955 |
| 2,761,606 | Pahl et al. | Sept. 4, 1956 |

FOREIGN PATENTS

| | | |
|---|---|---|
| 390,032 | France | July 17, 1908 |
| 556,169 | Italy | Feb. 2, 1957 |